(12) United States Patent
Wiehn et al.

(10) Patent No.: US 8,642,184 B2
(45) Date of Patent: Feb. 4, 2014

(54) FIRE-RESISTANT "ORIENTED STRAND BOARD" MATERIAL

(75) Inventors: Helmut Wiehn, Heuchelheim-Klingen (DE); Pieter Daeseleire, Reet (BE); Herman Meynaerts, Rillaar (BE)

(73) Assignee: Ecochem International, Naamloze Vennootschap, Olen (BE)

( * ) Notice: Subject to any disclaimer, the term of this patent is extended or adjusted under 35 U.S.C. 154(b) by 23 days.

(21) Appl. No.: 13/432,596

(22) Filed: Mar. 28, 2012

(65) Prior Publication Data

US 2012/0251817 A1    Oct. 4, 2012

(30) Foreign Application Priority Data

Mar. 28, 2011 (BE) .................................... 2011/0188

(51) Int. Cl.
*B32B 23/04* (2006.01)
(52) U.S. Cl.
USPC ............ 428/536; 428/537.1; 428/292.4; 427/212; 427/393; 156/325
(58) Field of Classification Search
USPC ............ 428/292.4, 536, 537.1; 427/212, 393; 156/325
See application file for complete search history.

(56) References Cited

U.S. PATENT DOCUMENTS

| | | | |
|---|---|---|---|
| 3,383,274 A | | 5/1968 | Craig |
| 3,438,847 A | * | 4/1969 | Chase ........................ 428/212 |
| 3,873,662 A | | 3/1975 | Cartlidge et al. |
| 3,874,990 A | * | 4/1975 | Surdyk ........................ 428/528 |
| 3,996,325 A | | 12/1976 | Megraw |
| 4,039,645 A | * | 8/1977 | Coyle ........................ 264/118 |
| 4,163,820 A | * | 8/1979 | Corver et al. ............... 428/212 |
| 5,418,282 A | * | 5/1995 | Wiehn ........................ 524/735 |
| 6,713,168 B2 | | 3/2004 | Liu et al. |
| 2002/0168476 A1 | * | 11/2002 | Pasek et al. ............... 427/393.3 |
| 2003/0064230 A1 | | 4/2003 | Liu et al. |

OTHER PUBLICATIONS

European Search Report and Written Opinion in BE 2011/00188, Nov. 18, 2011.

* cited by examiner

*Primary Examiner* — Leszek Kiliman
(74) *Attorney, Agent, or Firm* — Bacon & Thomas, PLLC

(57) ABSTRACT

Fire-resistant OSB (oriented strand board) material consisting of a middle layer and two outer layers, wherein the layers primarily consist of bonded wood flakes. There are one or more fire-retardant agents in the middle layer and one or both outer layers, and the nature and/or the concentrations of them in the middle layer are different from the nature and/or the concentrations of them in one or both outer layers.

14 Claims, 1 Drawing Sheet

FIRE-RESISTANT "ORIENTED STRAND BOARD" MATERIAL

BACKGROUND OF THE INVENTION

A. Field of the Invention

The present invention relates to OSB (oriented strand board) material.

B. Related Art

Oriented strand board, hereinafter termed OSB, is a type of wooden board made from oriented wood flakes. The board consists of a number (generally three) of layers of bonded wood flakes, a maximum of approx. 2 by 15 cm large and a thickness of one half to one-and-a-half mm.

The wood fibres in the outer layers are oriented in a certain direction on average, although not every wood flake is individually precisely oriented, while the flakes in the middle layer are oriented perpendicular to this direction or arbitrarily oriented.

This is a cheap way to obtain a constructional board with very good properties, especially with regard to rigidity, and with optimum use of all parts of a tree.

OSB board material is widely used in constructions, both in applications where the material is not visible, and also on account of its decorative properties.

A disadvantage of such a board material is its combustibility. There are some known ways of making existing board material of wood flakes fire resistant.

For example U.S. Pat. No. 3,874,990 states that moist wood material to be converted into wood flakes for the production of chipboard is mixed with dry alkaline borates, after which the wood material is further moistened and then cut into flakes. A second fire retardant agent, in the form of phosphoric acid-formaldehyde-dicyandiamide resin, is then added to obtain a chipboard with 10 to 16% fire-resistant agent.

This has the disadvantage that it is a complex method and that the second fire-retardant agent is an expensive product.

Furthermore, U.S. Pat. No. 4,039,645 states that moist wood flakes intended for the production of chipboard are treated to this end with a solution of borax decahydrate ($Na_2B_4O_7 \cdot 10H_2O$) and sulphuric acid, so that a chipboard with approx. 25 parts dry matter, consisting of a mixture of borax and sulphuric acid, per 100 parts dry wood is formed.

High contents of borax are hereby used, such that a relatively expensive board material is obtained. Boron compounds are also suspected of being harmful to health so a high boron content is undesirable.

U.S. Pat. No. 6,713,168 describes how dry wood flakes intended for a board material are mixed with an organophosphorus ester as a fire-retardant agent, in order to obtain a fire-resistant OSB board material with a content of this ester of 5 or 10 percent by weight.

This has the disadvantage that it is an expensive fire-retardant agent.

From U.S. Pat. No. 3,438,847, a chipboard and a method for manufacturing it is known, whereby the chipboard consists of three layers, and is made fire-resistant by introducing boric acid and sodium octaborate in the inner layer and the outer layers, whereby there is a higher concentration of both products in the outer layers than in the inner layer, thereby increasing the fire resistance of a limited quantity of fire-resistant agent.

The fibres for the separate layers are hereby manufactured by completely separate methods.

US 2002/0168476 describes another fire-resistant agent for wood composite: guanylurea phosphate.

This has the disadvantage that it is relatively expensive and that it is relatively easy for NH3 to be released during the manufacture of the wood composite, and thus could lead to a dark discolouring of the wood composite during its manufacture.

These methods, and the materials thereby produced, all have the disadvantage that the quantity and nature of the fire-retardant agents are not optimum to obtain sufficient fire-resistant properties of the OSB board material at the lowest possible cost price, whereby negative influences during production or on the quality of the OSB board material produced are minimised.

SUMMARY OF THE INVENTION

The purpose of the present invention is to provide a solution to at least one of the aforementioned and other disadvantages by providing a fire-resistant oriented strand board material consisting of a middle layer and two outer layers, whereby the layers primarily consist of bonded wood flakes, whereby there is a first fire-retardant agent in the middle layer, and whereby in one or both outer layers there is the first fire-retardant agent together with a second fire-retardant agent, whereby the fire-retardant agents in one or both outer layers provide a stronger fire-retardant effect than the fire-retardant agent or fire-retardant agents in the middle layer, and whereby the concentration of the first fire-retardant agent in the outer layer or outer layers in which it is present is less than in the middle layer.

In this way more options are available to achieve an optimum balance between the technical requirements and the costs of the fire-retardant agents.

For example, in the middle layer the fire-retardant agent or fire-retardant agents, and the concentration thereof, are chosen such that it is cheap, but has visually detrimental properties, for example by discolouring the wood fibres or causing stains. However this is not serious because the inside layer is not visible.

For the outer layers the fire-retardant agent or fire-retardant agents, and the concentration thereof, are chosen such that these visual disadvantages are not present, but other disadvantages such as alleged health risks, processing problems or a high cost price are present.

Thus, in this way for example it is possible to limit the quantity of a fire-retardant agent that is considered harmful to health, but which is cheap and technically good for the outer layer, in the board material as a whole.

A fire-resistant OSB board material is also obtained that can have good fire-resistant properties with a lower average quantity of fire-retardant agent, by making the OSB board material more flame-resistant on the outside than the inside.

As OSB board material is exposed to flames on its outside in the event of fire, it is the fire resistance of the outer layer or outer layers that is particularly important for the total fire resistance of the OSB board material.

As a result, such an OSB board material is more fire resistant than an OSB board material in which the fire-retardant agents are distributed evenly over all layers.

A further advantage is that such a fire-resistant OSB board material can be produced on a standard production line and with a standard method for OSB board material with few modifications, and thus efficiently.

Preferably the concentration of the first fire-retardant agent in the middle layer is between 5 and 25 parts by weight to 100 parts by weight of dry wood flakes and/or the concentration of the first fire-retardant agent in an outer layer is between 4 and 15 parts by weight to 100 parts by weight of dry wood flakes.

It has been shown that these are concentrations at which the fire-resistant properties obtained and the quantity of fire-retardant agent used, and thus the cost price, present a good optimum.

Preferably the first fire-retardant agent primarily consists of a compound or a mixture of compounds from the group of guanidine sulphamate, guanidine sulphate and guanidine phosphates.

These compounds form a good compromise between the characteristics with regard to price, fire resistance and workability in the process.

They are substantially cheaper than the known guanylurea phosphate.

These are also attractive compounds with regard to the very limited dark discolouring of the wood flakes, which occurs with many other fire-retardant agents.

In a further preferred embodiment, the second fire-retardant agent primarily consists of a compound or a mixture of compounds from the group of boric acid, borax, sodium octaborate or polyborate compounds, and the average concentration of it in the OSB board material is less than 3.1 percent by weight of $B_2O_3$ equivalents.

This has the advantage that the fire-retardant agents are relatively cheap, cause very little discolouring of the wood flakes, and in the concentration used are acceptable from the point of view of noxiousness.

Preferably the concentration of the second fire-retardant agent is between 1 and 15 parts by weight to 100 parts by weight of dry wood flakes, whereby the concentration in the outer layers is greater, and preferably at least 2 times greater, and more preferably at least 4 times greater than the concentration in the middle layer.

The invention also comprises a method for manufacturing fire-resistant oriented strand board material consisting of a middle layer and two outer layers, based on wood flakes, whereby this method comprises the following steps in the following order: step A—wood flakes are sprayed with a solution of a first fire-retardant agent and are then dried; the wood flakes treated according to the previous step intended for the middle layer are sprayed and mixed with a binder; step B—wood flakes treated according to the previous step intended for at least one outer layer are sprayed and mixed with a solution of a second fire-retardant agent and a binder.

This is an easy and cheap method for making a fire-resistant OSB that involves few modifications to a standard production facility.

Preferably step A is done with moist wood flakes.

These are wood flakes produced from freshly harvested wood. Typically, depending on the type of wood, the season, and the transport conditions, they have a moisture content of 50 to 200 parts water to 100 parts dry wood. Thus these wood flakes do not need to undergo any supplementary pre-treatment.

Preferably step A is done with a mixture of wood flakes that contains wood flakes intended for the middle layer and for at least one outer layer, and that the separation of the wood flakes intended for the middle layer and the wood flakes intended for at least one outer layer is done between step A and step B.

Because the wood flakes for the outer layers are larger than those for the middle layer, and moist wood flakes are used, so that the first fire-resistant agent essentially remains on the surface of the wood flakes, this easily results in the wood flakes intended for the outer layer having a lower concentration of the first fire-retardant agent.

Preferably the first fire-retardant agent primarily consists of a guanidine salt or a mixture of guanidine salts, or preferably a compound or mixture of compounds from the group of guanidine sulphamate, guanidine sulphate and guanidine phosphates.

It has turned out that these compounds only have a very limited undesired darkening effect on the colour of the OSB board material produced.

Preferably, before spraying the solution of the first fire-retardant agent is brought to a pH that is suitable for the binder in order to prevent premature hardening.

This means that the pH is such that negative effects on the binder are largely avoided. This pH is different for every binder.

For example, for the most commonly used binder for OSB board material, MDI (methylene diphenyl di-isocyanate), guanidine salts can initialise the polymerisation of the MDI, probably on account of their free electron pairs, and thus cause premature hardening of the binder.

It is thus less desirable to use guanidine salts as a simple solution.

It has been shown that this detrimental premature polymerisation of the binder can be largely prevented by acidifying the solution of the first binder to a pH less than 5.

For phenol resin this pH is 7 to 9, and for MUF (melamine-urea-formaldehyde) 5 to 7.

Preferably the second fire-retardant agent primarily consists of a compound or a mixture of compounds from the group of boric acid, borax, sodium octaborate or polyborate compounds, and it is used in such a quantity that its average concentration in the OSB board material is less than 3.1 percent by weight $B_2O_3$ equivalents.

Here the solution of the second fire-retardant agent is preferably made by dissolving a mixture of boron-containing compounds, that primarily or entirely consists of a mixture of borax and boric acid, in water.

In this way a polyborate compound is formed in the aqueous solution, which has much higher solubility than borax or boric acid separately.

However, disodium octaborate can also be dissolved to make the solution of the second fire-retardant agent.

It is possible that the first and second fire-retardant agents used in the method are the same, such that thanks to this method considerable control over the distribution of the fire-resistant agent in the OSB board material is obtained with minimum modification to the standard production process.

DESCRIPTION OF THE DRAWINGS

With the intention of better showing the characteristics of the invention, a preferred embodiment of fire-resistant OSB board material according to the invention and a method according to the invention, with which such OSB board material can be manufactured, are described hereinafter by way of an example, without any limiting nature, with reference to the accompanying drawings, wherein.

DETAILED DESCRIPTION OF EXEMPLARY EMBODIMENTS

Figure 1:
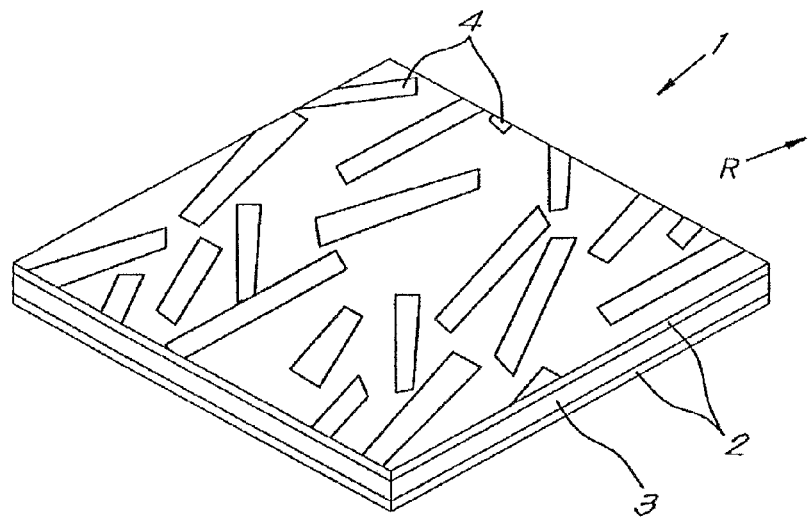
FIG. 1 schematically shows in perspective a piece of OSB board material according to the invention.

The OSB board material 1 shown in FIG. 1 consists of two outer layers 2 and a middle layer 3. All layers 2, 3 consist of bonded wood flakes 4, whereby part of the wood flakes 4 are shown in one outer layer 2 in FIG. 1.

The wood flakes 4 in both outer layers 2 are oriented in a certain direction R on average, without every individual wood flake 4 having precisely this orientation.

The middle layer 3 is around twice as thick as each of the outer layers 2. However this can vary somewhat depending on the total thickness of the OSB board material 1 used, as is known to a person skilled in the art.

The wood flakes in the middle layer 3 are oriented perpendicular to the direction R on average.

The middle layer 3 contains, aside from a few percent of water, approximately fifteen parts diguanidine phosphate to one hundred parts dry wood, and traces of boron compounds.

The outer layers 2 contain, aside from a few percent of water, approximately ten parts diguanidine phosphate and approximately ten parts boron compounds per one hundred parts dry wood. The boron compounds largely occur as hydrated boron oxides, which consist of a mixture of boric acid, borax, sodium octaborate and similar polyborates.

Taken generally the OSB board material consists of approximately 2% $B_2O_3$ equivalents.

Figure 2:
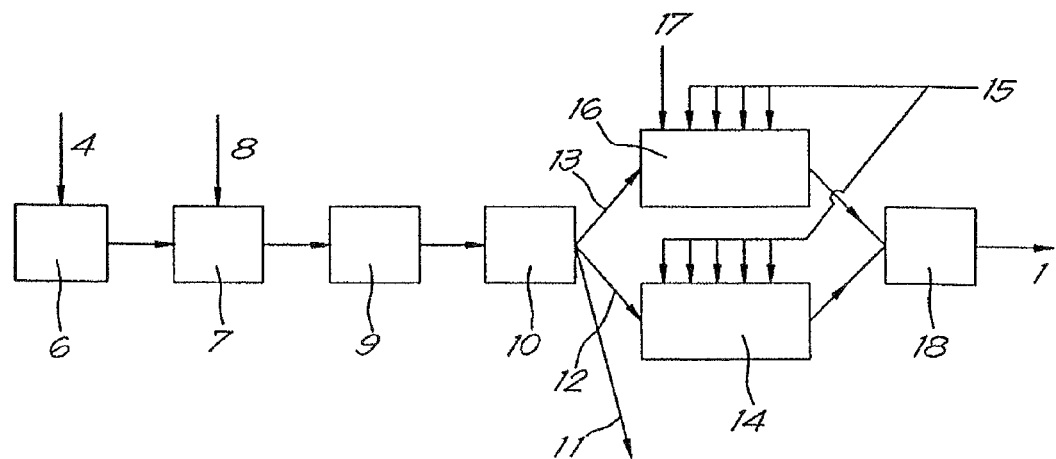
FIG. 2 shows a step diagram of a method for manufacturing OSB board material according to FIG. 1.

OSB board material 1 can be made with a method whose steps are shown in FIG. 2.

To this end there is a supply of moist wood flakes 4 that are made from relatively recently harvested wood, and contain their natural moisture content. They are stored in silo 6.

The wood flakes 4 are transported from the silo 6 to a mixer 7 with sprayers and there they are sprayed and mixed with a concentrated solution 8 of diguanidine phosphate that is brought to a pH value of 4.5 with phosphoric acid, in such a quantity that approximately fifteen parts of diguanidine phosphate are added to one hundred parts of dry wood. This solution can also contain a surfactant.

These thus treated wood flakes 4 are dried in a dryer 9 until they contain two to three parts water to one hundred parts dry wood, and are separated into fractions in a screening unit 10, i.e. a fine fraction 11 that is not further used in the method, a medium fraction 12 that contains around fifteen parts diguanidine phosphate to one hundred parts dry wood and is intended for the middle layer 3, and a coarse fraction 13 that contains approximately ten parts diguanidine phosphate to one hundred parts dry wood and is intended for the outer layers 2.

The medium fraction 12 and the coarse fraction 13 are temporarily stored in silos until they are further processed.

The medium fraction 12 of wood flakes 4 is now mixed in a mixer 14 with five parts MDI (methylene diphenyl di-isocyanate) 15 per hundred parts wood. This is a standard binder for OSB board material 1.

The coarse fraction 13 of wood flakes 4 is mixed in a mixer 16 with twenty five parts of a solution 17 that consists of 15% borax, 15% boric acid (and 10% disodium octaborate in water, and with five parts MDI per one hundred parts dry wood.

After this, this coarse fraction contains one hundred parts wood, ten parts diguanidine phosphate, ten parts boron compounds, five parts MDI and fifteen parts water, such that the water content is approximately 11.5%.

Then the fractions 12, 13 of wood flakes 4 thus treated are further processed in the traditional subsequent steps 18 to make OSB board material 1.

First a layer of the wood flakes 4 from the coarse fraction 13 is spread with an orientation that corresponds to the production direction R of the OSB, on top of which there is a layer of wood flakes 4 from the medium fraction 12 with an orientation perpendicular to the production direction, and then on which there is another layer of the coarse fraction 13, with the same orientation as the first-mentioned layer of wood flakes 4 of the coarse fraction 13.

The quantity of wood flakes used for the middle layer is approximately equal to the quantity for the top and bottom layers together.

The spread layers are now compressed at high temperature (approximately 190° C.), whereby the MDI polymerises and the wood flakes 4 bind together, such that OSB board material 1 is formed.

Hereby the higher water content in the coarser fraction 13 of wood flakes 4 acts as a means to transport heat to the middle layer faster, because this water partly evaporates and flows to the middle layer as hot water vapour.

Because some boron compounds can be volatile under these conditions, the transport of a small proportion of the boron compounds to the middle layer may also take place.

The thus formed OSB board material 1 has been tested with good results for its fire-resistant properties and presents scarcely any darkening on its surface.

Instead of diguanidine phosphate, use can also be made of monoguanidine phosphate, guanidine sulphamate or guanidine sulphate with a similar result, or a mixture of these products.

The present invention is by no means limited to the embodiment described as an example and shown in the drawings, but a fire-resistant OSB board material and a method to manufacture it can be realised in all kinds of variants, without departing from the scope of the invention.

The invention claimed is:

1. A fire-resistant oriented strand board material comprising:
   a middle layer and two outer layers, said outer layers comprising bonded wood flakes that are substantially oriented in a first direction and said middle layer comprising bonded wood flakes that are substantially oriented in a second direction;
   at least one first fire-retardant agent provided in the middle layer;
   the at least one first fire-retardant agent and at least one second fire-retardant agent provided in one or both outer layers;
   said at least one first and second fire-retardant agents in one or both outer layers having a stronger fire-retardant effect than all fire-retardant agents in the middle layer; and
   wherein the concentration of the first fire-retardant agent in the outer layer or outer layers in which the first fire-retardant agent is present is lower than the concentration of the first fire-retardant agent in the middle layer.

2. The oriented strand board material according to claim 1, wherein the concentration of the first fire-retardant agent in the middle layer is between five and twenty five parts by weight to one hundred parts by weight of dry wood flakes, and in an outer layer between four and fifteen parts by weight to one hundred parts by weight of dry wood flakes.

3. The oriented strand board material according to claim 1, wherein the average concentration of the second fire-retardant agent in the oriented strand board material is between one and fifteen parts by weight to one hundred parts by weight of dry wood flakes, wherein the concentration in the outer layers is greater than the concentration in the middle layer.

4. The oriented strand board material according to claim 1, wherein the first fire-retardant agent primarily consists of a guanidine salt or a mixture of guanidine salts.

5. The oriented strand board material according to claim 4, wherein the first fire-retardant agent primarily consists of a compound or a mixture of compounds selected from the group consisting of guanidine sulphamate, guanidine sulphate and guanidine phosphate.

6. The oriented strand board material according to claim 1, wherein the second fire-retardant agent primarily consists of a compound or a mixture of compounds selected from the group consisting of boric acid, borax, sodium octaborate and polyborate compounds: and the average concentration of the second fire-retardant agent in the oriented strand board material is less than 3.1 percent by weight $B_2O_3$ equivalents.

7. Method for manufacturing fire-resistant oriented strand board material having a middle layer and two outer layers, said layers formed of bonded wood flakes, the method comprising the steps:
(a) spraying wood flakes with a solution of a first fire-retardant agent and then drying the wood flakes; and then
(b) spraying and mixing the wood flakes that were treated according to the previous step that are intended for the middle layer, with a binder and spreading the wood flakes with an orientation in a first direction, and spraying and mixing wood flakes treated according to the previous step intended for at least one outer layer with a solution of a second fire-retardant agent and with a binder and spreading the wood flakes with an orientation in a second direction.

8. The method according to claim 7, wherein step (a) is carried out with moist wood flakes.

9. The method according to claim 7, wherein step (a) is carried out with a mixture of wood flakes that are intended for the middle layer and for at least one outer layer, and wherein separation of the wood flakes intended for the middle layer and the wood flakes intended for at least one outer layer is done between step (a) and step (b).

10. The method according to claim 7, wherein the quantity used and concentration of the solution of the first fire-retardant agent are such that between six and twenty parts by weight of the first fire-retardant agent to one hundred parts by weight of dry wood flakes are used, and the quantity and concentration of the solution of the second fire-retardant agent are such that between two and thirty parts by weight of the second fire-retardant agent to one hundred parts by weight of dry wood flakes that are intended for at least one outer layer are used.

11. The method according to claim 7, wherein the solution of the first fire-retardant agent is brought to a pH that is appropriate to prevent premature hardening of the binder.

12. Method according to claim 7, wherein the first fire-retardant agent primarily consists of a guanidine salt or a mixture of guanidine salts.

13. Method according to claim 12, wherein the first fire-retardant agent primarily consists of a compound or a mixture of compounds selected from the group consisting of guanidine sulphamate, guanidine sulphate and guanidine phosphates.

14. Method according to claim 8, wherein the second fire-retardant agent primarily consists of a compound or a mixture of compounds selected from the group consisting of boric acid, borax, sodium octaborate or polyborate compounds, and the second fire-retardant agent is used in such a quantity that its average concentration in the OSB board material is less than 3.1 percent by weight $B_2O_3$ equivalents.

* * * * *